United States Patent [19]

Agah et al.

[11] Patent Number: 5,003,573
[45] Date of Patent: Mar. 26, 1991

[54] SELF-DIAGNOSIS OF LOOP START AND GROUND START TRUNK INTERFACES

[75] Inventors: Michael D. Agah; Michael E. Locke, both of Santa Clara,, Calif.

[73] Assignee: Rolm Systems, Santa Clara, Calif.

[21] Appl. No.: 508,865

[22] Filed: Apr. 12, 1990

[51] Int. Cl.⁵ .............................................. H04M 1/24
[52] U.S. Cl. .................................... 379/27; 379/1/234
[58] Field of Search ........................ 379/22, 26, 27, 29, 379/1, 234

[56] References Cited

U.S. PATENT DOCUMENTS

4,796,290 1/1989 Perry ...................................... 379/27

Primary Examiner—Stafford D. Schreyer
Attorney, Agent, or Firm—Michael B. Einschlag

[57] ABSTRACT

Method and apparatus for sectionalization and self-diagnosis of loop start and ground start trunk interfaces without intervention from host telephone company equipment. The inventive method entails the use of an isolation relay in the trunk circuit to isolate the trunk circuit electrically from the physical medium and to apply various signals to portions of the isolated trunk circuit to carry out specific self-diagnostic tests.

15 Claims, 6 Drawing Sheets

SELF-DIAGNOSIS OF LOOP START AND GROUND START TRUNK INTERFACES

TECHNICAL FIELD OF THE INVENTION

The present invention pertains to method and apparatus for diagnosing troubles in loop start and ground start trunk interface equipment.

BACKGROUND OF THE INVENTION

Present telecommunications systems involve interfacing applications processors (APs) to host telephone equipment such as, for example, central office telephone equipment or private business exchange (PBX) equipment. In many cases, an analog trunk is the means by which such an interface is effected and, as a result, it is important to assure that the trunk is functioning properly, from a signaling as well as from an audio standpoint. In general, even when a trunk is functioning properly there are two sources of error which can affect the interface between the AP and, for example, the PBX. One source of error is a failure in the trunk interface between the trunk and the AP and the second source of error is a failure in the AP itself.

As one can readily appreciate, there is a need in the art for method and apparatus for sectionalizing a trouble to either the host telephone equipment, including the trunk, to the trunk interface between the trunk, or to the AP. In addition, if the trouble has been sectionalized to the trunk interface, there is a need in the art for method and apparatus for determining the specific portion of the trunk interface that is causing the trouble, i.e., for diagnosing the cause of the trouble.

SUMMARY OF THE INVENTION

Embodiments of the present invention advantageously satisfy the above-identified need in the art and provide method and apparatus for sectionalizing a trouble which occurs in a connection between host telephone equipment, a trunk—a physical medium which connects the host telephone equipment to a trunk interface circuit, and the trunk interface circuit. Further, if the trouble has been sectionalized to the trunk interface circuit, embodiments of the present invention advantageously perform self-diagnostic tests for determining the specific portion of the trunk interface circuit that is causing the trouble. In particular, embodiments of the present invention are applicable for sectionalizing such troubles in loop start or ground start trunks.

In one embodiment of the present invention, a ground or loop start seizure test is performed and, then, the trunk interface circuit is isolated from the host telephone equipment and self-diagnostic tests of the trunk interface circuit are run. The trunk seizure test and the self-diagnostic tests are run back to back for a specific reason. The reason is that if the self-diagnostic tests were run only after the trunk seizure test failed, certain failures would go undetected. Specifically, the trunk seizure test could pass even though the ring detector and/or the audio path of the interface were not functioning properly. Thus, if the trunk seizure test fails and the self-diagnostic tests pass completely, then it has been determined that either the host telephone equipment or the trunk connecting the trunk interface circuit and the host telephone equipment has failed. However, if the self-diagnostic test fails, then it has been determined that specific circuitry within the trunk interface circuit is causing a fault.

Specifically, an embodiment of the present invention comprises: start means, in response to signals transmitted thereto from a controller, for generating a predetermined signal which corresponds to a loop start or a ground start seizure of the host telephone equipment; detection means for detecting a predetermined signal which corresponds to a loop start or ground start response from the host telephone equipment and for transmitting a signal in response thereto the controller; isolation means, connected to the trunk interface circuit, for isolating the trunk interface circuit from the trunk in response to signals transmitted thereto from the controller; and self-diagnostic test means for performing at least one self-diagnostic test on the trunk interface circuit in response to commands from the controller.

In further embodiments of the present invention self-diagnostic tests of the trunk interface circuit comprise: (a) testing a battery feed circuit, a loop current detector circuit, a ring ground circuit and a tip ground detect circuit of the trunk interface circuit; (b) testing a ring detection circuit of the trunk interface circuit; and (c) testing voice circuitry which drives transformer of the trunk interface circuit.

BRIEF DESCRIPTION OF THE DRAWING

A complete understanding of the present invention may be gained by considering the following detailed description in conjunction with the accompanying drawing, in which.

DETAILED DESCRIPTION

Figure 1:
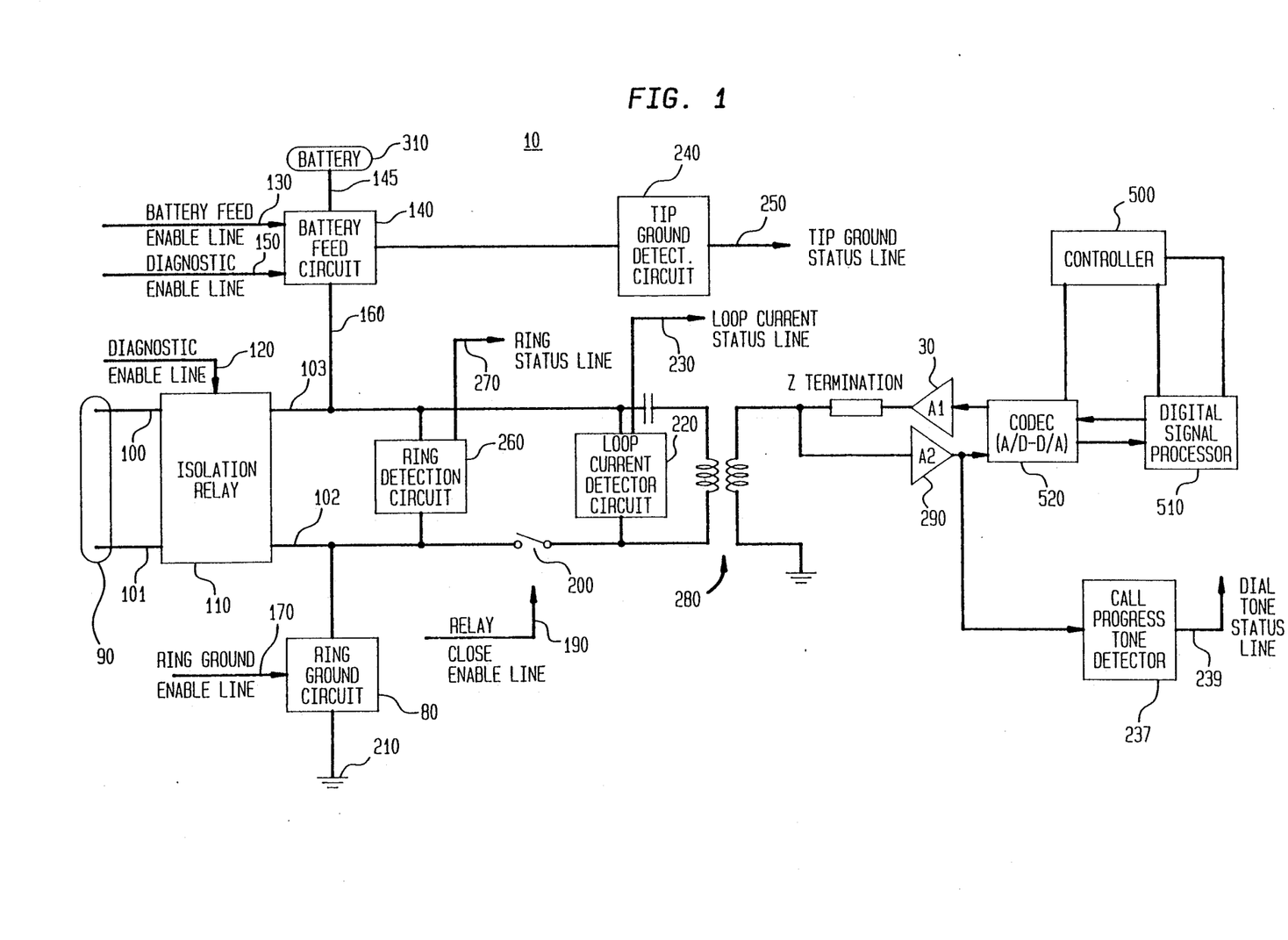
FIG. 1 is a block diagram of an embodiment of an inventive trunk interface circuit for use in sectionalizing troubles in loop start and ground start trunks and for performing self-diagnostic tests thereof.

FIG. 1 is a block diagram of trunk interface circuit 10 for use in sectionalizing troubles in loop start and ground start trunks. As shown in FIG. 1, trunk 90, the physical medium which connects trunk interface circuit 10 and host telephone company equipment (not shown), comprises tip 100 and ring 101. Tip 100 and ring 101 of trunk 90 are connected to isolation relay 110 of trunk interface circuit 10. Controller 500 interfaces with trunk interface circuit 10 through various control lines to enable the various components of trunk interface circuit 10 to operate in the manner which is described in detail below. In effect, controller 500 performs a trouble sectionalization of loop start or ground start trunk 90 in accordance with the inventive method as follows.

As a first step in the sectionalization, a seizure test which involves the host telephone equipment is performed. This test is performed in the ground start mode by applying ground to ring lead 102 and by applying battery to tip lead 103. To apply ground to ring lead 102, controller 500 transmits a signal over ring ground enable line 170 to enable ring ground circuit 180 and, to apply battery to tip lead 103, controller 500 transmits a signal over battery feed enable line 130 to enable battery feed circuit 140. A description of the manner in which the signal is generated over battery feed enable line 130 will be set forth in detail below in connection with FIG. 2 and a description of an embodiment of battery feed circuit 140 will be set forth in detail below in connection with FIG. 3. Further, ring ground circuit 180 is apparatus which is well known to those of ordinary skill in the art, it has relatively low resistance, and a description of an embodiment of ring ground circuit 180 will be set forth below in connection with FIG. 4.

At this point, controller 500 monitors tip lead 103 by waiting for a signal from tip ground detect circuit 240 over tip ground status line 250 to indicate when and if the host telephone equipment responds to the ground start from trunk interface circuit 10. Tip ground detect circuit 250 is apparatus which is well known to those of ordinary skill in the art, it has relatively high impedance, and a description of tip ground detect circuit 250 will be set forth below in connection with FIG. 5. If it is functioning properly, the host telephone equipment will respond to the ground start from trunk interface circuit 10 by pulling tip lead 100 to ground.

If controller 500 receives a signal over tip ground status line 250 to indicate that the host telephone equipment has applied a ground on tip 100, controller 500 will: (a) transmit a signal over relay close enable line 190 to close relay 200; (b) transmit a signal over ring ground enable line 170 to unground ring lead 102; and (c) monitor loop current status line 230 for an indication that loop current detector circuit 220 detected loop current flow. Loop current detector circuit 220 is apparatus which is well known to those of ordinary skill in the art, it has relatively low resistance, and a description of an embodiment of loop current detector circuit 220 will be set forth below in connection with FIG. 6.

While controller 500 is waiting for loop current to flow, to provide a simple check of the audio path and to increase the capability of checking the handshaking between the host telephone equipment and trunk interface circuit 10, call progress tone detector 237 monitors the audio path in trunk interface circuit 10 after amplifier 290. When dial tone is present on trunk 90, it takes call progress tone detector 237 40 msec to detect this and to generate a status signal which is applied to controller 500 over dial tone status line 239. In the preferred embodiment, call progress tone detector 237 is chip 75T980 which is commercially available from Silicon Systems Incorporated.

Even if the above-described ground start seizure test passes, i.e., loop current and dial tone have been detected, as a second step in the sectionalization, controller 500 will return trunk interface circuit 10 to its idle state, isolate trunk interface circuit 10 from the host telephone equipment, and run self-diagnostic tests which are described below. The trunk seizure test and the self-diagnostic tests are run back to back for a specific reason. The reason is that if the self-diagnostic tests were run only after the trunk seizure test failed, certain failures would go undetected. Specifically, the trunk seizure test could pass even though the ring detector and/or the audio path of the interface were not functioning properly. If the ground start seizure test fails and the self-diagnostic tests pass completely, then controller 500 will output a message to the effect that either the host telephone equipment or the trunk connecting trunk interface circuit 10 and the host telephone equipment has failed. If the self-diagnostic test fails, controller 500 will output a message to the effect that circuitry within trunk interface circuit 10 is causing a fault and, optionally, controller 500 will take trunk interface circuit 10 out of service by sending a message to other equipment in an applications processor (AP) which utilizes trunk interface circuit 10. It should be clear to those of ordinary skill in the art that such messages may be implemented in the form of generating signals which are input to further devices such as an AP or to a device such as a display terminal or a printer and so forth.

The only difference in the above, when applied to a loop start trunk, is the content of the seizure test. For example, in carrying out a seizure in a loop start trunk, controller 500 transmits a signal over relay close enable line 190 to close relay 200. Then, controller 500 monitors loop current status line 230 to determine whether loop current was detected by loop current detector circuit 220 and monitors dial tone status line 239 to determine whether dial tone was detected by call progress tone detector 237.

Next, various self-diagnostic tests are performed to isolate troubles to specific circuits within trunk interface circuit 10.

The first self-diagnostic test of trunk interface circuit 10 comprises a test of battery feed circuit 140, loop current detector circuit 220, ring ground circuit 180 and tip ground detect circuit 240. As a first step in the first self-diagnostic test, controller 500 transmits a signal over diagnostic enable line 120 to isolation relay 110—a description of the manner in which the signal is generated over diagnostic enable line 120 will be set forth in detail below in connection with FIG. 2. In response to this signal, isolation relay 110 is activated and, as a result, trunk interface circuit 10 is disconnected from the trunk connecting trunk interface circuit 10 to the host telephone equipment. Isolation relay 110 is apparatus which is well known to those of ordinary skill in the art and it may be obtained, for example, as circuit TN2E-5V from Aromat Corporation of the Matsushita Group.

As a second step in the first self-diagnostic test, controller 500 transmits a signal over battery feed enable line 130 to enable battery feed circuit 140. Battery feed circuit 140 is connected to negative battery source 310 by means of line 145. As is well known in the art, a battery feed circuit which is used in typical ground start applications, has a relatively high series resistance. However, as will be explained in detail below, whenever controller 500 transmits a signal over diagnostic enable line 150 to battery feed circuit 140, battery feed circuit 140 supplies a larger current over line 160 than it does in normal ground start operation. This assures no compromise between the normal operating mode of trunk interface circuit 10 and the sectionalization mode of trunk interface circuit 10, i.e., they operate independently in that the sectionalization mode does not utilize a design which alters the performance of trunk interface circuit 10 in its normal operating mode.

As a third step in the first self-diagnostic test, controller 500 transmits a signal over ring ground enable line 170 to activate ring ground circuit 180. In response to this signal from controller 500, ring ground circuit 180 is activated and ring lead 102 is pulled to ground potential. As a fourth step in the first self-diagnostic test, controller 500 transmits a signal over relay close enable line 190 to activate relay 200. When relay 200 is activated, a DC path is established from battery feed circuit 140 to ground 210 through loop current detector circuit 220. As one can readily appreciate, if ample amounts of current flow through loop detector circuit 220 and, if this portion of trunk interface circuit 10 is functioning properly, loop detector circuit 220 will indicate a change of state to controller 500 over loop current status line 230. Further, due to the relatively low resistance of ring ground circuit 180 and loop current detect circuit 220, tip lead 103 is pulled close to ground potential when relay 200 is closed. If this portion of trunk interface circuit 1 is functioning properly, tip ground detect circuit 240 will indicate a change of state to controller 500 over line 250.

The second self-diagnostic test of trunk interface circuit 10 comprises a test of ring detection circuit 260. As a first step in the second self-diagnostic test, controller 500 transmits a signal over diagnostic enable line 120 to isolation relay 110 and, as a result, trunk interface circuit 10 is disconnected from the trunk connecting trunk interface circuit 10 to the host telephone equipment. As a second step in the second self-diagnostic test, controller 500 transmits a signal over battery feed enable line 130 to enable battery feed circuit 140 and transmits a signal over diagnostic enable line 150 to battery feed circuit 140 so that battery feed circuit 140 supplies a larger current over line 160 than it does in normal ground start operation. As a third step in the second self-diagnostic test, controller 500 sends signals over relay close enable line 190 and over ring ground enable line 170 to toggle relay 200 and ring detection circuit 260 out of phase. As a result of this out of phase toggling action, large voltage spikes are produced across the input to ring detection circuit 260, which voltage spikes simulate a ringing signal. In response to the simulated ringing signal applied thereto, if it is functioning properly, ring detection circuit 260 will indicate a change of state to controller 500 over ring status line 270.

The third self-diagnostic test of trunk interface circuit 10 comprises a test of voice circuitry in trunk interface circuit 10 which drives transformer 280. As a first step in the third self-diagnostic test, controller 500 transmits a signal over diagnostic enable line 120 to isolation relay 110 and, as a result, trunk interface circuit 10 is disconnected from the trunk connecting trunk interface circuit 10 to the host telephone equipment. When trunk 90 is disconnected from trunk interface circuit 10, the impedance reflected back to the secondary of transformer 280 from leads 102 and 103 is high. As a second step in the third self-diagnostic test, controller 500 transmits a signal over relay close enable line 190 to activate relay 200. As a third step in the third self-diagnostic test, controller 500 causes digital signal processor 510 (DSP 510) to output a test signal to CODEC 520. DSP 510 is apparatus which is well known to those of ordinary skill in the art and it may be obtained, for example, as processor ADSP2101 from Analog Devices CODEC 520 is apparatus which is well known to those of ordinary skill in the art for converting analog-to-digital and for converting digital-to-analog converter and it may be obtained, for example, as circuit TP3070 from National Semiconductor. Because the impedance reflected back to the secondary of transformer 280 from leads 102 and 103 is high, the signal appearing at the output of trunk interface circuit 10 at leads 102 and 103 is "looped back" to the input of CODEC 520 through amplifier 290. DSP 510 receives the "looped" signal and compares it to what it sent out to leads 102 and 103 through amplifier 300 in the first place. As a third step in the third self-diagnostic test, DSP 510 compares the two signals, in a manner which is well known to those of ordinary skill in the art, for signal amplitude distortion, harmonic distortion, or low signal-to-noise ratio. For example, such a method which is implemented in a DSP for testing the AC characteristics of trunk interface 10 is found in an article entitled "Method of Measuring and Compensating for Telephone Line Distortion," by M. E. Locke, *IBM Technical Disclosure Bulletin*, Vol. 31, No. 9, February, 1989, pp. 455–457.

Figure 2:
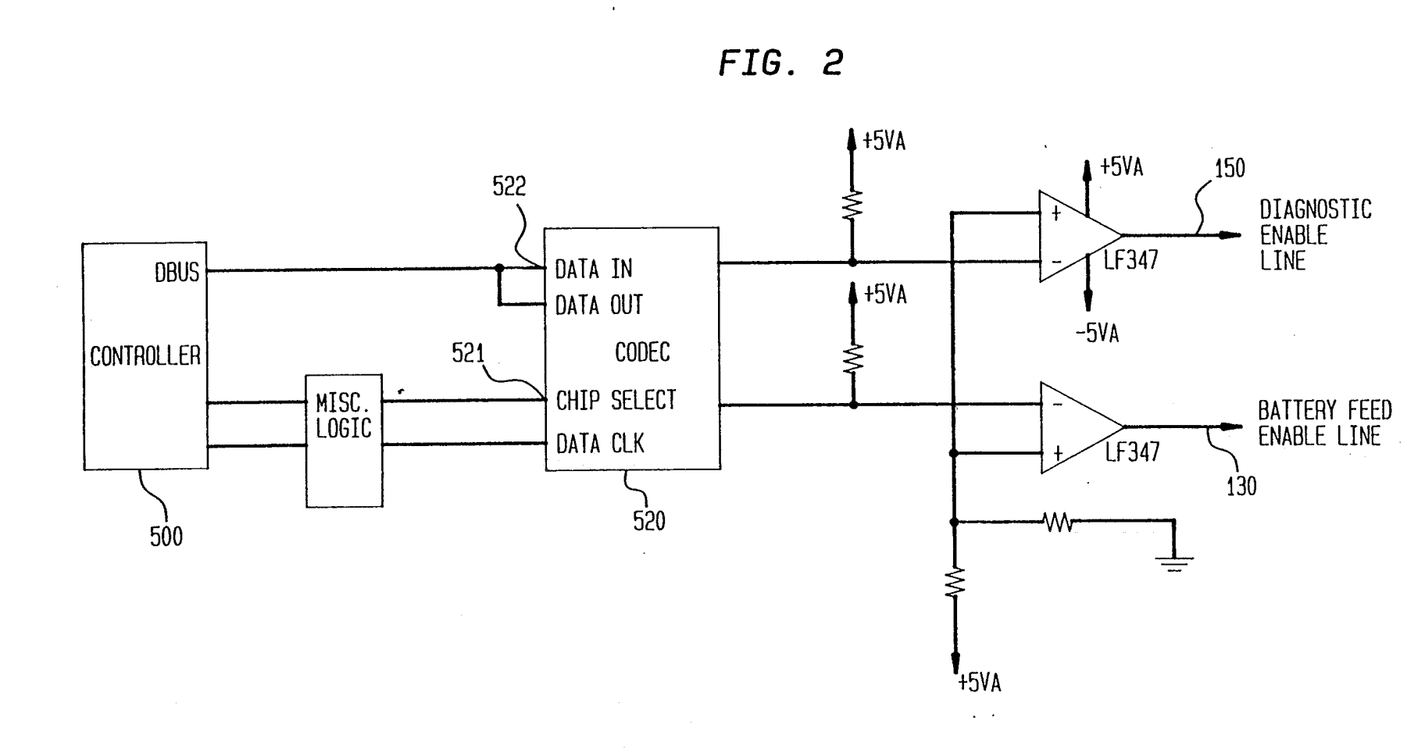
FIG. 2 is a block diagram of an embodiment of apparatus which provides signals on a diagnostic enable line and on a battery feed enable line, which signals are utilized by embodiments of the, present invention.

FIG. 2 is a block diagram which illustrates an embodiment of a circuit for providing a signal on diagnostic enable line 150 and on battery feed enable line 130. Controller 500, here a Z80 microprocessor which is available from Zilog Inc., interfaces with CODEC 520, here a TP3070 CODEC which is available from National Semiconductor. CODEC 520 is controlled by controller 500 by means of an asynchronous serial interface which runs between the two devices. Controller 500 selects CODEC 520 by enabling chip select pin 521 and then latching in two data bytes to CODEC 520 at data in pin 522. The first byte is a register address, for example, in this embodiment the output latch register in CODEC 520 controls the logic state of the output from CODEC 520, and the second byte contains the data targeted for the register. In response to this data, CODEC 520 causes a signal to be output over diagnostic enable line 150 and/or battery feed enable line 130.

Figure 3:
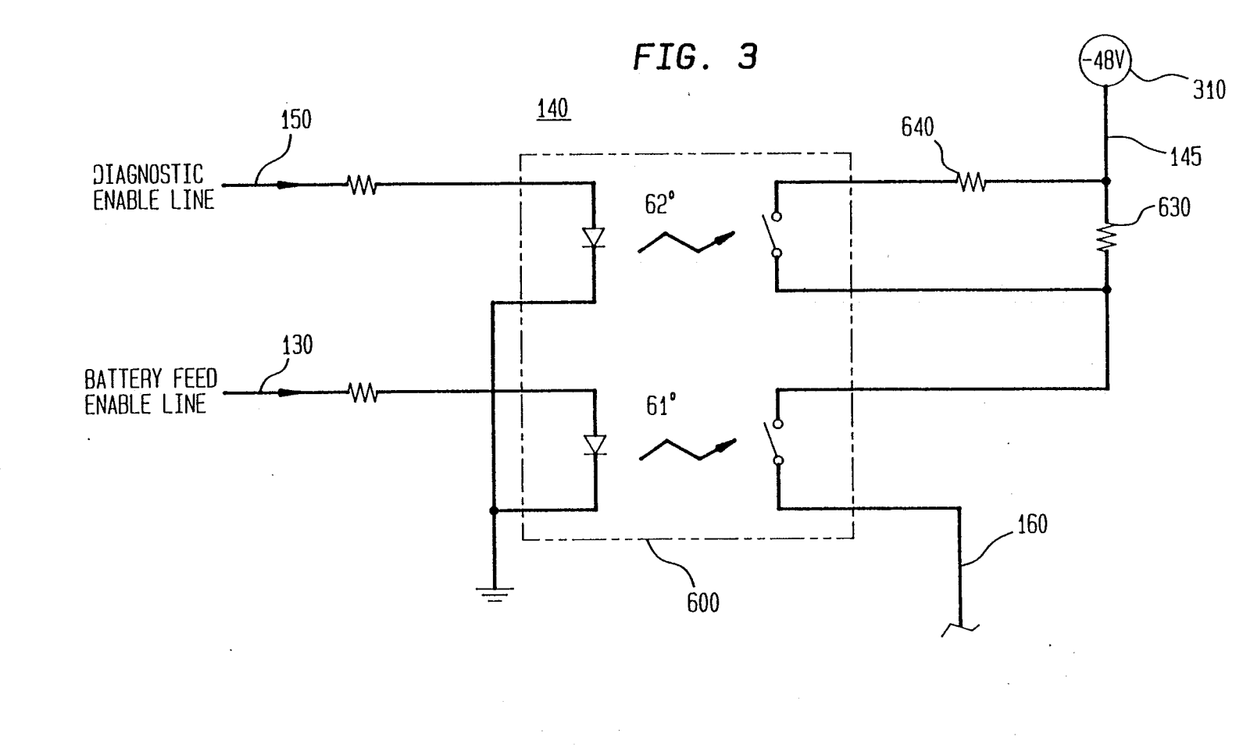
FIG. 3 is a circuit diagram of an embodiment of a battery feed circuit for use in fabricating embodiments of the present invention.

FIG. 3 is a circuit diagram of an embodiment of battery feed circuit 140 which may be used to fabricate embodiments of inventive trunk interface circuit 10. As shown in FIG. 3, circuit 600 is a solid state switch which is available, for example, form the Theta-J Division of CP Clare Corp. The use of this particular switch is advantageous in that it has a small physical profile and, in a typical application, space is critical. In a normal ground start operation, pole 610 of switch 600 is closed while pole 620 is open. This presents resistor 630, having about 37.4 Kohm of resistance, between tip lead 103 and AC ground in accordance with FCC part 68, DOC CS-30 issue 6a and EIA RS-464 specifications. However, when utilized in the diagnostic mode, pole 620 is closed and almost all the battery current from -48 v source 310 flows through a much smaller resistor, for example, approximately 1000 ohm resistor 640.

Figure 4:
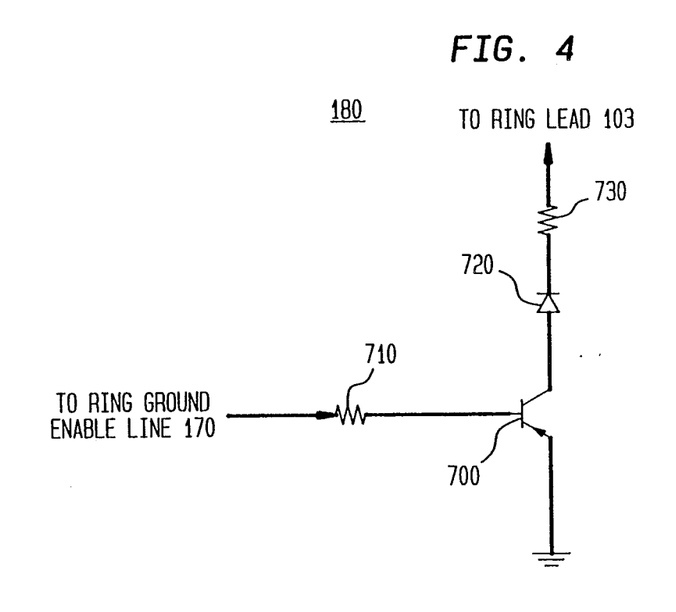
FIG. 4 is a circuit diagram of an embodiment of a ring ground circuit for use in fabricating embodiments of the present invention.

FIG. 4 shows a circuit diagram of an embodiment of ring ground circuit 180 which may be used to fabricate embodiments of inventive trunk interface circuit 10. Specifically, ring ground circuit 180 comprises silicon PNP transistor 700, for example, an MPSA92 transistor which is available from a whole host of companies such as Motorola, which transistor 700 is connected to resistor 710, diode 720, for example, IN4005 which is available from a whole host of companies such as Motorola, and ground. Resistor 710 is connected, in turn, to ring ground enable line 170 and diode 720 is connected to resistor 730 which is connected, in turn, to ring lead 103.

Figure 5:
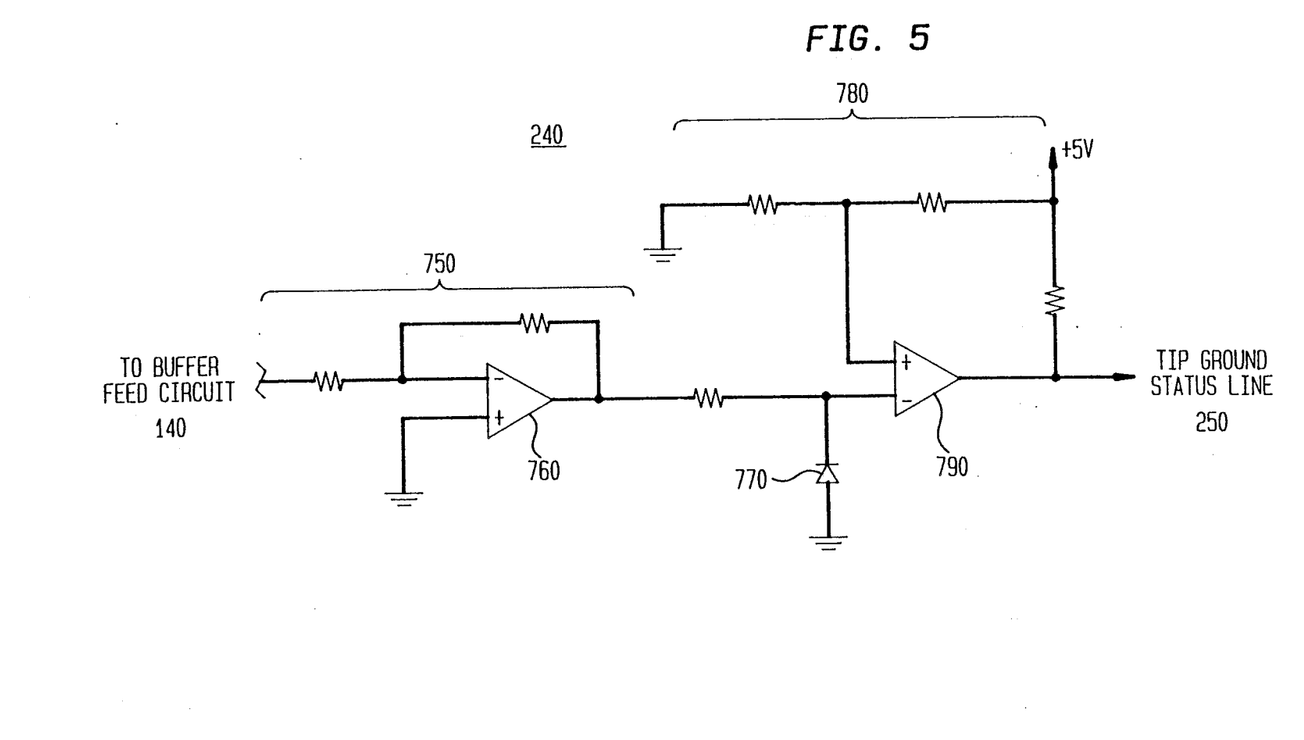
FIG. 5 is a circuit diagram of an embodiment of a tip ground detector circuit which may used in fabricating embodiments of the present invention.

FIG. 5 shows a circuit diagram of an embodiment of tip ground detect circuit 240 which may be used to fabricate embodiments of inventive trunk interface circuit 10. Specifically, tip ground detect circuit 240 comprises attenuator 750 and voltage comparator 780. Attenuator 760 utilizes op-amp 760, for example, circuit LF347 which is available from National Semiconductor and voltage comparator 780 which comprises diode 770, for example, circuit HSMS-2820 which is available from Hewlett Packard, and op-amp 790, for example, circuit LM393 which is available from National Semiconductor.

Figure 6:
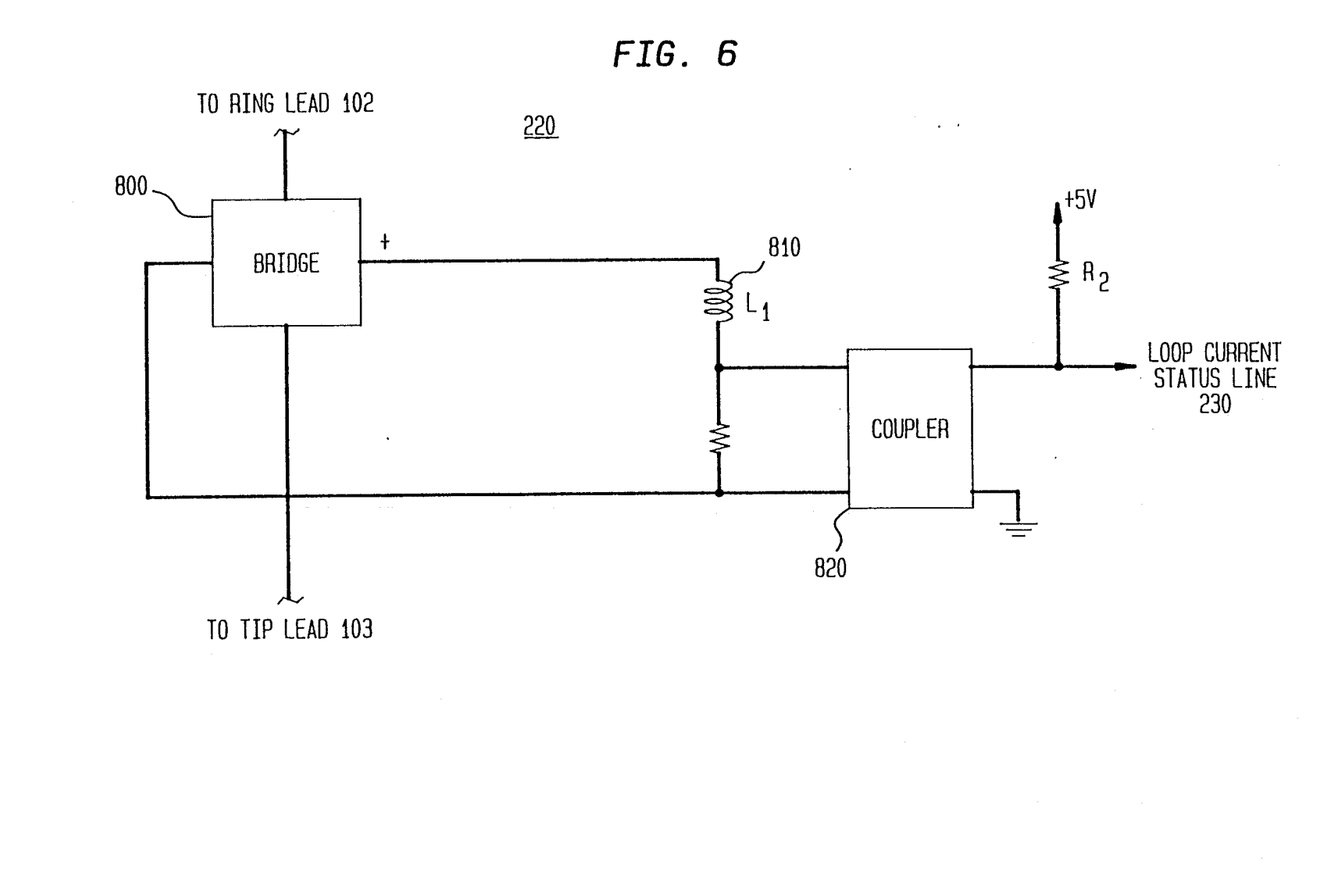
FIG. 6 is a circuit diagram of an embodiment of a loop current detector ground circuit which may used in fabricating embodiments of the present invention.

FIG. 6 shows a circuit diagram of an embodiment of loop current detector circuit 220 which may be used to fabricate embodiments of inventive trunk interface circuit 10. Specifically, loop current detector 220 comprises bridge 800, for example, diode bridge circuit DL04 which is available from General Instrument, inductor 810, and coupler 820, for example, opto-coupler 4N35 which is available from Texas Instruments.

It should be clear to those of ordinary skill in the art that although controller 500 may be implemented in logic arrays, in a preferred embodiment of the present invention, controller 500 is fabricated as comprising a microprocessor and sufficient memory so that the microprocessor may be programmed to implement the various steps set forth in detail above.

It should be clear to those of ordinary skill in the art that further embodiments of the present invention may be made without departing from its teachings.

What is claimed is:

1. Apparatus for sectionalizing a fault in a connection between telephone equipment, a trunk, i.e., a physical medium which connects the telephone equipment to a trunk interface circuit, and the trunk interface circuit comprises:

start means, in response to signals transmitted thereto from a controller, for generating a predetermined signal which corresponds to a loop start or a ground start seizure of the telephone equipment;

detection means for detecting a predetermined signal which corresponds to a loop start or ground start from the telephone equipment and for transmitting a signal in response thereto to the controller;

isolation means, connected to the trunk interface circuit, for isolating the trunk interface circuit from the trunk in response to signals transmitted thereto from the controller; and self-diagnostic test means for performing at least one self-diagnostic test on the trunk interface circuit in response to commands from the controller.

2. The apparatus of claim 1 wherein the trunk comprises a tip and a ring and wherein the start means for a ground start seizure comprises a ring ground means for applying ground to the ring in response to a signal from the controller and a battery feed means for applying a potential to the tip in response to a signal from the controller.

3. The apparatus of claim 2 wherein the detection means comprises a tip ground detect means for detecting when the tip is substantially at ground.

4. The apparatus of claim 3 wherein the start means further comprises relay means which closes in response to a signal from the controller and wherein the detection means further comprises loop current detector means for detecting current in a loop comprised of the tip and ring.

5. The apparatus of claim 1 wherein the start means for a loop start seizure comprises relay means which closes in response to a signal from the controller and wherein the detection means comprises loop current detector means for detecting current in a loop comprised of the tip and ring.

6. Apparatus for self-diagnostic testing a trunk interface circuit which connects to a trunk comprised of a tip and ring, which trunk interface circuit comprises a battery feed means, a ring detection means, a ring ground means for grounding the tip, a loop current detector means, a relay means, and a tip ground detect means, which apparatus comprises:

isolation means, connected to the trunk interface circuit, for isolating the trunk interface circuit from the trunk in response to signals transmitted thereto from a controller;

wherein the battery feed means provides a first current in response to a battery feed enable signal from the controller and a second, larger current in response to a diagnostic enable signal from the controller.

7. The apparatus of claim 6 wherein the controller comprises means for generating a signal which causes the isolation means to isolate the trunk interface circuit from the trunk; means for generating the diagnostic enable signal which causes the battery feed means to supply the second current; means for generating a signal for causing ring ground means to pull the ring to ground; and means for generating a signal which causes the relay means to establish a DC path from the battery feed means to ground through the loop current detector means.

8. The apparatus of claim 7 wherein the controller further comprises means for detecting a signal from the loop detector means which indicates a change of state.

9. The apparatus of claim 8 wherein the controller further comprises means for detecting a signal from the tip ground detect means which indicates a change of state.

10. The apparatus of claim 6 wherein the controller comprises means for generating a signal which causes the isolation means to isolate the trunk interface circuit from the trunk; means for generating the diagnostic enable signal which causes the battery feed means to supply the second current; means for generating a ring-ground signal for causing ring ground means to pull the ring to ground and means for generating a DC-path signal which causes the relay means to establish a DC path from the battery feed means to ground through the loop current detector means, the ring-ground signal and the DC-path being toggled out of phase; and means for detecting a signal from the ring detection means which indicates a change of state.

11. Apparatus for self-diagnostic testing a trunk interface circuit which connects to a trunk comprised of a tip and ring, which trunk interface circuit comprises a relay means and a transformer means, which apparatus comprises:

isolation means, connected to the trunk interface circuit, for isolating the trunk interface circuit from the trunk in response to signals transmitted thereto from a controller;

wherein the controller comprises means for generating a signal which causes the isolation means to isolate the trunk interface circuit from the trunk; means for generating a signal which causes the relay means to form path from tip to ring through a first side of the transformer; means for generating a test signal which is applied to the second side of the transformer; and means for detecting the signal which is reflected back from the tip and ring and comparing it with the test signal.

12. Method for sectionalizing a fault in a connection between telephone equipment, a trunk, i.e., a physical medium which connects the telephone equipment to a trunk interface circuit, and the trunk interface circuit comprises the steps of:
   generating a loop start seizure or a ground start seizure of the telephone equipment;
   detecting a loop start response or a ground start response from the telephone equipment;
   isolating the trunk interface circuit and performing self-diagnostic tests on the trunk interface circuit.

13. The method of claim 12 wherein the trunk is comprised of a tip and ring, the trunk interface circuit is comprised of a battery feed means, a ring detection means, a ring ground means for grounding the tip, a loop current detector means, a relay means, and a tip ground detect means, and wherein a self-diagnostic test comprises the steps of:
   applying a signal to the battery feed means to cause it to generate a relatively large current to the tip;
   applying a signal to the ring ground means to cause it to pull the ring to substantially to ground;
   applying a signal to the relay means to cause it to establish a DC path to ground through loop detector means; and
   detecting a change of state of the loop detector means.

14. The method of claim 13 wherein a self-diagnostic test comprises the steps of:
   applying a signal to the battery feed means to cause it to generate a relatively large current to the tip;
   applying a signal to the relay means which causes it to pull the ring substantially to ground and applying a signal to the ring detection means to cause the relay means and the ring detection means to toggle out of phase to simulate ringing; and
   detecting a change of state of the ring detection means.

15. Method for self-diagnostic testing a trunk interface circuit which connects to a trunk comprised of a tip and ring, which trunk interface circuit comprises a relay means and a transformer means, which method comprises the steps of:
   isolating the trunk interface circuit;
   applying a signal which causes the relay means to form path from tip to ring through a first side of the transformer;
   applying a test signal to the second side of the transformer; and
   detecting the signal which is reflected back from the tip and ring and comparing it with the test signal.

* * * * *